(12) United States Patent
Chokkalingam et al.

(10) Patent No.: US 10,536,348 B2
(45) Date of Patent: Jan. 14, 2020

(54) OPERATIONAL MICRO-SERVICES DESIGN, DEVELOPMENT, DEPLOYMENT

(71) Applicant: AT&T Intellectual Property I, L.P., Atlanta, GA (US)

(72) Inventors: Sendhil Chokkalingam, Redmond, WA (US); Srinivasan Ramakrishnan, Holmdel, NJ (US); Prasanna Ramachandran, Hazlet, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 133 days.

(21) Appl. No.: 15/581,968

(22) Filed: Apr. 28, 2017

(65) Prior Publication Data
US 2018/0314549 A1    Nov. 1, 2018

(51) Int. Cl.
*H04L 12/24* (2006.01)

(52) U.S. Cl.
CPC ................. *H04L 41/5051* (2013.01)

(58) Field of Classification Search
CPC .................................................... G06F 9/4881
See application file for complete search history.

(56) References Cited

U.S. PATENT DOCUMENTS

| | | | |
|---|---|---|---|
| 8,830,823 B2 | 9/2014 | Koponen et al. | |
| 9,397,952 B2 | 7/2016 | Liu et al. | |
| 9,398,081 B2 | 7/2016 | Li et al. | |
| 9,525,647 B2 | 12/2016 | Koponen et al. | |
| 9,946,983 B1 * | 4/2018 | Shashi | G06Q 10/06316 |
| 2007/0162324 A1 * | 7/2007 | Suzuki | G06Q 10/06 705/7.26 |
| 2008/0177612 A1 * | 7/2008 | Starink | G06Q 10/06 705/7.26 |
| 2013/0212234 A1 * | 8/2013 | Bartlett | G06Q 10/0633 709/220 |
| 2014/0201642 A1 | 7/2014 | Vicat-Blanc | |
| 2014/0215058 A1 | 7/2014 | Vicat-Blanc et al. | |
| 2014/0379885 A1 | 12/2014 | Krishnamurthy et al. | |
| 2015/0113132 A1 | 4/2015 | Srinivas et al. | |
| 2015/0113133 A1 | 4/2015 | Srinivas et al. | |
| 2015/0229709 A1 | 8/2015 | Pruss et al. | |
| 2015/0304239 A1 | 10/2015 | Kusano | |
| 2015/0319049 A1 | 11/2015 | Nachum | |
| 2016/0124742 A1 | 5/2016 | Rangasamy et al. | |
| 2016/0232078 A1 | 8/2016 | Biswas et al. | |

(Continued)

FOREIGN PATENT DOCUMENTS

| | | |
|---|---|---|
| CN | 103795596 A | 5/2014 |
| CN | 103955373 A | 7/2014 |

(Continued)

OTHER PUBLICATIONS

Szyrkowiec et al.; "First field demonstration of cloud datacenter workflow automation employing dynamic optical transport network resources under OpenStack and OpenFlow orchestration"; Optics Express 22.3; 2014; 8 pages.

(Continued)

*Primary Examiner* — Sisley N Kim
(74) *Attorney, Agent, or Firm* — BakerHostetler

(57) ABSTRACT

Components may provide functionality which separate operation functions in a separate entity, isolate the functions as reusable, and connect them in a control loop in an SDN environment.

20 Claims, 10 Drawing Sheets

(56) References Cited

U.S. PATENT DOCUMENTS

2016/0285972 A1 9/2016 Puttagunta et al.
2017/0006082 A1 1/2017 Shishodia

FOREIGN PATENT DOCUMENTS

| CN | 105634127 A | 6/2016 |
|----|-------------|--------|
| JP | 2016-042248 A | 3/2016 |
| WO | WO 2016/013200 A1 | 1/2016 |
| WO | WO 2016/072996 A1 | 5/2016 |

OTHER PUBLICATIONS

"Create Workflow Apps & Online Forms with Ease"; PerfectForms; 2016; 2 pages.
Velasco et al.; "iONE: A Workflow-Oriented ABNO Implementation"; IEEE Conf. Photonics in Switching 2015—Optical Networking (Topic 4); 2015; p. 345-347.

* cited by examiner

OPERATIONAL MICRO-SERVICES DESIGN, DEVELOPMENT, DEPLOYMENT

TECHNICAL FIELD

The technical field generally relates to software-defined networks and, more specifically, to managing software changes in software-defined networks.

BACKGROUND

Communication networks have migrated from using specialized networking equipment executing on dedicated hardware, like routers, firewalls, and gateways, to virtualized network components, such as VNFs and virtual machines (VM) that may be implemented or run on general purpose hardware within a cloud infrastructure. Network management of network components—whether or not virtualized—may require implementing, from time to time, software changes across the network or across a subset of the network components. These software changes may include software patches, software updates, configuration changes, or installation/uninstallation of software.

In a cloud environment, control loop automation can be categorized into open loop or closed loop systems. Open loop systems capture telemetry and diagnostics information from the underlying cloud infrastructure (e.g. syslog, SNMP, fault and performance management events), perform a set of analytics and provide reporting or alarms to the operations team. Control loop systems play a vital role in processes implemented in a cloud based environment. For example, closed and open loops have been implemented to support fault management for limited virtual network functions such as a wide-area virtual network management framework which acts as an infrastructure provider to manage the physical resources and service provider to build and manage virtual networks on the physical resources.

SUMMARY

Disclosed herein are concepts of open loop task processing for SDN Operations user community and workflow authors. API Stitching Workflow Designer, Reusable workflow execution pattern, Task Management dashboard for open loop tasks. Each component provides layers of abstraction which may separate operations functions in a separate entity, isolates those functions as reusable, and connect it to a control loop in an SDN environment. With the API Stitching Workflow Designer the operations administrator focus on building the API collection, workflow collection, and task sequencing on each workflow without any additional programming efforts. The API stitching workflow designer could focus on building reusable workflow which executes the workflow based on metadata input payload so that the workflows are reusable by other workflows defined in the API Stitching Workflow Designer. With the reusable workflow and metadata input payload available, the task management dashboard is ready to consume the workflow through graphical user interface. The task management dashboard performs user authentication, performs role authorization, and orchestrates the open loop tasks behind the scene using reusable workflow.

In an example, an apparatus may include a processor and a memory coupled with the processor that effectuates operations. The operations may include generating a workflow for a virtual machine that comprises a first application programming interface (API) and a second API; identifying metadata based on the workflow; determining that the workflow is reusable; and responsive to determining that the workflow is reusable, cataloging the workflow for subsequent use.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
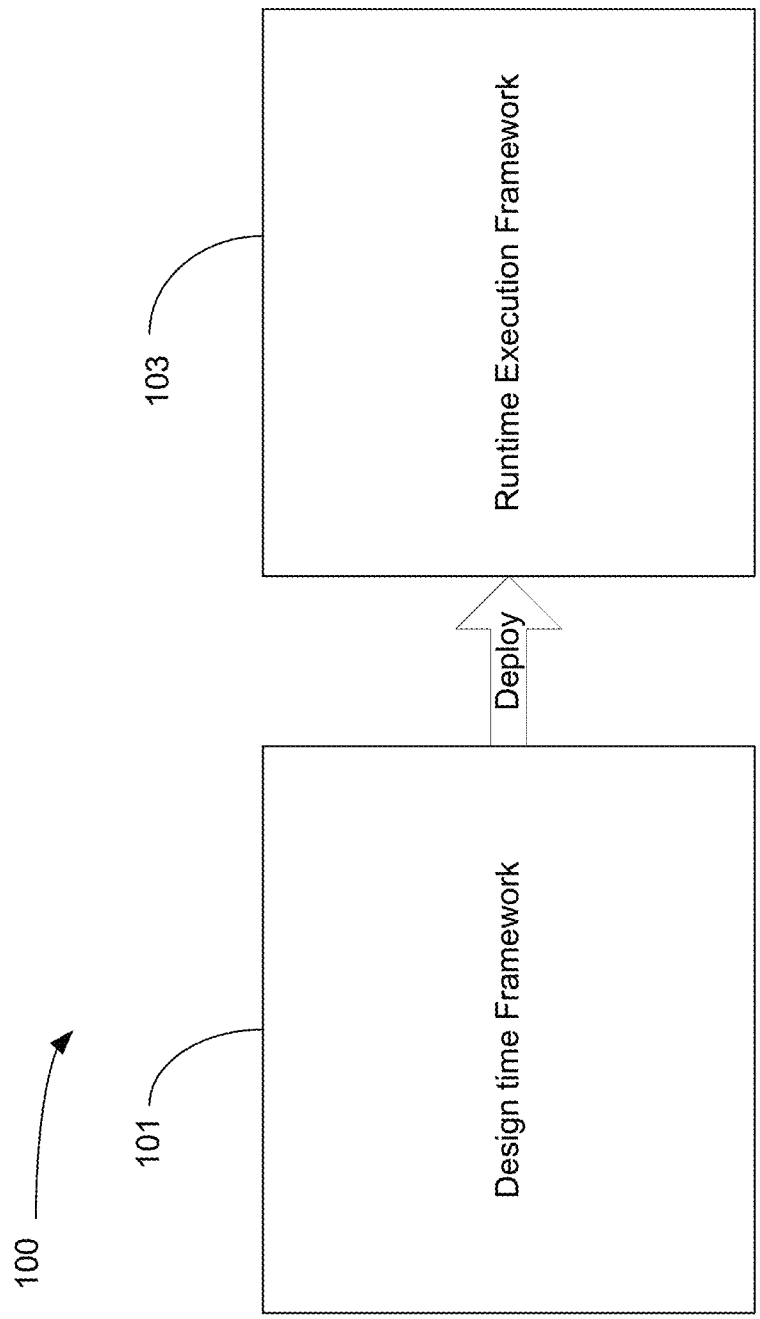
FIG. 1 is a block diagram illustrating the architecture of an enhanced control, orchestration, management and policy platform (ECOMP) in which an embodiment of a control loop automation management platform may be implemented. The embodiment may be implemented in two types of architectures, such as centralized or distributed.

Illustrated in FIG. 1 is a schematic of the architecture of an enhanced control, orchestration, management and policy platform, (ECOMP platform 100) that is implemented in a cloud environment. The ECOMP platform 100 includes a design time framework component 101 and a runtime execution framework 103. The cloud environment provides a number of capabilities including real-time instantiation of virtual machines (VMs) on commercial hardware where appropriate; dynamic assignment of application and workloads to VMs; dynamic movement of applications and dependent functions to different VMs on servers within and across data centers in different geographies (within the limits of physical access tiedowns constraints); and dynamic control of resources made available to applications (CPU, memory, storage). With the use of network function virtualization, network appliances have been transformed into software applications. In the integrated cloud environment the dynamic cloud capabilities are applied to applications—i.e., virtual network functions (VNFs)—thus applying the benefits of the cloud environment to virtual network elements. For example, VNFs, such as routers, switches, firewalls, can be "spun up" on commodity hardware, moved from one data center to another center dynamically (within the limits of physical access tie-down constraints) and resources such as CPU, memory and storage can be dynamically controlled.

The ECOMP platform 100 enables the rapid on-boarding of new services and the reduction of operating expenses and capital expenses through its metadata-driven service design and creation platform and its real-time operational management framework—a framework that provides real-time, policy driven automation of management functions. The metadata-driven service design and creation capabilities enable services to be defined with minimal information technology development required thus contributing to reductions in capital expenses. Real-time operational management framework provide significant automation of network management functions enabling the detection and correction of problems in an automated fashion contributing to reductions in operating expenses.

The ECOMP platform 100 enables product/service independent capabilities for design, creation and lifecycle management. The design time framework component 101 is an integrated development environment with tools, techniques, and repositories for defining/describing network assets. The design time framework component 101 facilitates re-use models thus improving efficiency as more models are available for reuse. Assets include models of the cloud environment resources, services and products. The models include various process specifications and policies (e.g., rule sets) for controlling behavior and process execution. Process specifications are used by the ECOMP platform 100 to automatically sequence the instantiation, delivery and lifecycle management aspects of the integrated cloud environment based resources, services, products and the components of the ECOMP platform 100. The design time framework component 101 supports the development of new capabilities, augmentation of existing capabilities and operational improvements throughout the lifecycle of a service. Service design and creation (SDC), policy, and data collection, analytics and events (DCAE) software development kits (SDKs) allow operations/security, 3rd parties (e.g., vendors), and other experts to continually define/refine new collection, analytics, and policies (including recipes for corrective/remedial action) using a design framework portal. Certain process specifications (aka 'recipes') and policies are geographically distributed to many points of use to optimize performance and maximize autonomous behavior in integrated cloud environment's federated cloud environment.

The runtime execution framework 103 executes the rules and policies distributed by a design and creation environment. This allows for the distribution of policy enforcement and templates among various ECOMP modules (described below). These components advantageously use common services that support logging, access control, and data management.

Figure 2:
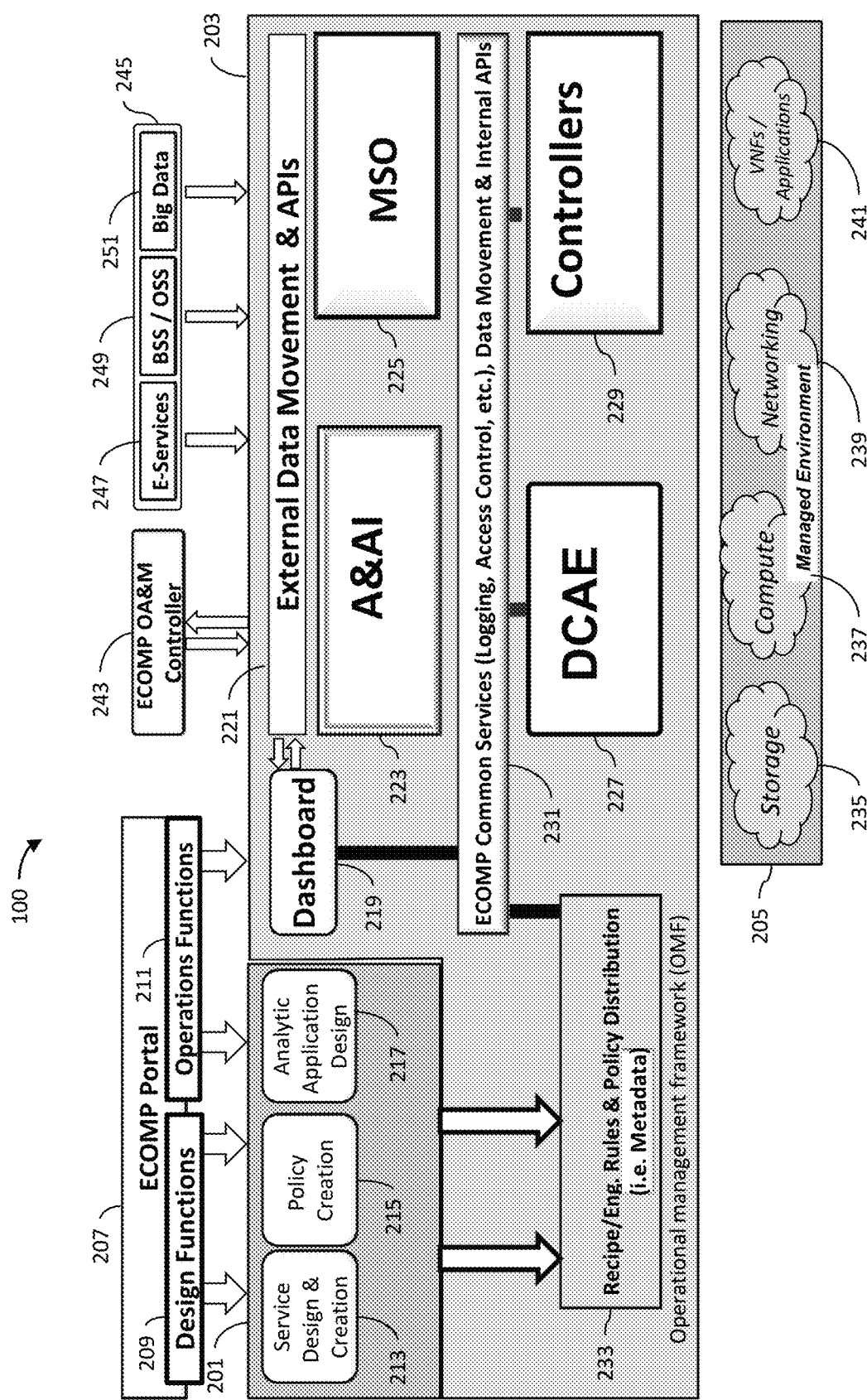
FIG. 2 is a block diagram of a platform for enhanced control, orchestration, management and policy in which embodiments of the control loop automation management platform may be implemented.

Illustrated in FIG. 2 are the components of an embodiment of the ECOMP platform 100. The ECOMP platform 100 is provided with three environments. These are the design creation environment 201, the execution environment 203, and the managed environment 205 shown as shaded areas in FIG. 2.

The ECOMP platform 100 includes an ECOMP Portal 207 that provides design functions 209 and operations functions 211. The design functions 209 include a service design and creation component 213 and policy creation component 215. The operations functions 211 include analytic application design component 217 and a dashboard 219. The service design and creation component 213, the policy creation component 215 and analytic application design component 217 are all part of the design creation environment 201. The dashboard is part of the execution environment 203.

In addition to the dashboard 219 the execution environment 203 includes: an external data movement and application program interface component, (API component 221); an active and available inventory module, (A&AI module 223); a master service orchestrator, (MSO 225); a data collection, analytics and events component, (DCAE module 227); controllers 229; a common services component 231; and a recipe/engineering rules and policy distribution component 233.

The managed environment 205 comprises resources, either hardware or software, that may be categorized as: infrastructure resources—(the Cloud resources, e.g., Storage 235, Compute 237); networking resources 239 (network connectivity functions & elements); and VNF/application resources 241 (the features and capabilities of a software application).

Interacting with the execution environment may be an operations, administration and management controller, (OA&M Controller 243); and a number of external applications 245 that may include e-services 247, business support system and operational support systems, (BSS/OSS application 249), and big data services 251 among others.

Additional description regarding the components is disclosed below. The policy creation component 215 deals with policies, which are conditions and requirements, constraints, attributes, or needs that must be provided, maintained, or enforced. At a lower level the policy creation component 215 involves machine-readable rules enabling actions to be taken based on triggers or requests. Policies often consider specific conditions in effect (both in terms of triggering specific policies when conditions are met, and in selecting specific outcomes of the evaluated policies appropriate to the conditions). Policies allow rapid updates through easily updating rules, thus updating technical behavior of components in which those policies are used, without requiring rewrites of their software code. Policies permit simpler management/control of complex mechanisms via abstraction. The policy creation component 215 may include a policy editor; policy rules subcomponent; conflict identification subcomponent; policy storage subcomponent. The policy storage subcomponent may include a library and templates.

The policy creation component 215 has a broad scope supporting infrastructure, product/services, operation automation, and security-related policy rules. These policy rules are defined by multiple stakeholders, (Network/Service Designers, Operations, Security, customers, etc.). In addition, input from various sources (service design and creation component 213, policy editor, customer input, etc.) are collected and rationalized. Therefore, a centralized policy creation environment will be used to validate policies rules, identify and resolve overlaps and conflicts, and derive policies where needed. The policy creation component 215 is accessible, developed and managed as a common asset, and provides editing tools to allow users to easily create or change policy rules. Offline analysis of performance/fault/closed-loop action data are used to identify opportunities to discover new signatures and refine existing signatures and closed loop operations. Policy translation/derivation functionality is also included to derive lower level policies from higher level policies. Conflict detection and mitigation are used to detect and resolve policies that may potentially cause conflicts, prior to distribution. Once validated and free of conflicts, policies are placed in an appropriate repository.

After completing initial policy creation or modification to existing policies, the policy distribution component 233 sends policies (e.g., from the repository) to their points of use, in advance of when they are needed. This distribution is intelligent and precise, such that each distributed policy-enabled function automatically receives only the specific policies which match its needs and scope.

Notifications or events can be used to communicate links/URLs for policies to components needing policies, so that components can utilize those links to fetch particular policies or groups of policies as needed. Components in some cases may also publish events indicating they need new policies, eliciting a response with updated links/URLs. Also, in some cases policies can be given to components indicating they should subscribe to one or more policies, so that they receive updates to those policies automatically as they become available.

The analytic application design component 217 includes an analytics software development kit (SDK), and storage for key performance indicators (KPIs), alarms, operators, etc., as well as storage for analytic application.

The dashboard 219 includes a manual action subcomponent, a reporting subcomponent 403 and a topology visualization subcomponent. The dashboard 219 provides access to design, analytics and operational control/administration functions.

The A&AI module 223 is the component that provides real-time views of the resources, services, products and their relationships. The views provided by the A&AI module 223 relate data managed by multiple ECOMP platforms 100, business support systems and operation support systems, (BSS/OSS application 249), and network applications to form a "top to bottom" view ranging from the products customers buy to the resources that form the raw material for creating the products. A&AI module 223 not only forms a registry of products, services, and resources, it also maintains up-to-date views of the relationships between these inventory items. Active and available inventory submodule 409 will manage these multi-dimensional relationships in real-time. The A&AI module 223 is provided with an inventory management submodule, an entitlements submodule and a resource/service topology submodule.

The inventory and topology data includes resources, service, products, and customer subscriptions, along with topological relationships between them. Relationships captured by A&AI module 223 include "top to bottom" relationships such as those defined in the service design and creation component 213 and when products are composed of services, and services are composed of resources. It also includes "side to side" relationships such as end to end connectivity of virtualized functions to form service chains. A&AI module 223 also keeps track of the span of control of each controller, and is queried by MSO 225 and placement functions to identify which controller to invoke to perform a given operation.

A&AI module 223 is metadata driven, allowing new inventory item types to be added dynamically and quickly via catalog definitions, reducing the need for lengthy development cycles. A&AI module 223 provides the following key requirements:

Provide accurate and timely views of resource, service, and product inventory and their relationship to the customer's subscription;
Deliver topologies and graphs;
Maintain relationships to other key entities (e.g., location) as well as non-integrated cloud environment inventory;
Maintain the state of active, available and assigned inventory within the ECOMP platform 100;
Allow introduction of new types of Resources, Services, and Products without a software development cycle (i.e., be metadata driven);
Be easily accessible and consumable by internal and external clients;
Provide functional APIs that expose invariant services and models to clients;
Provide highly available and reliable functions and APIs capable of operating as generic cloud workloads that can be placed arbitrarily within the cloud infrastructure capable of supporting those workloads;
Scale incrementally as volumes in the ECOMP platform 100 and cloud infrastructure scales;
Perform to the requirements of clients, with quick response times and high throughput;
Enable vendor product and technology swap-outs over time, e.g., migration to a new technology for data storage or migration to a new vendor for MSO 225 or Controllers 229;
Enable dynamic placement functions to determine which workloads are assigned to specific components of the ECOMP platform 100 (i.e., Controllers 229 or VNFs) for optimal performance and utilization efficiency; and
Identify the controllers 229 to be used for any particular request.

A&AI module 223 also performs a number of administrative functions. Given the model driven basis of the ECOMP platform 100, metadata models for the various catalog items are stored, updated, applied and versioned dynamically as needed without taking the system down for maintenance. Given the distributed nature of the A&AI module 223 as well as the relationships with other components of the ECOMP platform 100, audits are periodically run to assure that the A&AI module 223 is in sync with the inventory masters such as controllers 229 and MSO 225. Adapters allow the A&AI module 223 to interoperate with non-integrated cloud environment systems as well as 3rd party cloud providers via evolving cloud standards.

Consistent with other applications of the ECOMP platform 100, the A&AI module 223 produces canned and ad-hoc reports, integrates with the dashboard 219, publishes notifications other components of the ECOMP platform 100 can subscribe to, and performs logging consistent with configurable framework constraints.

The primary function of MSO 225 is the automation of end-to-end service instance provisioning activities. MSO 225 includes a request handler, an orchestration engine, adapters, and service catalog service recipes. MSO provides an interface to orchestrate delivery of integrated cloud environment services. In general, orchestration can be viewed as the definition and execution of workflows or processes to manage the completion of a task. The ability to graphically design and modify a workflow process is the key differentiator between an orchestrated process and a standard compiled set of procedural code. Orchestration provides adaptability and improved time-to-market due to the ease of definition and change without the need for a development engagement. As such, it is a primary driver of flexibility in the architecture. Interoperating with policies, the combination provides a basis for the definition of a flexible process that can be guided by business and technical policies and driven by process designers.

Orchestration exists throughout the integrated cloud environment architecture and is not be limited to the constraints implied by the term "workflow" as it typically implies some degree of human intervention. Orchestration in integrated cloud environment will not involve human intervention/decision/guidance in the vast majority of cases. The human involvement in orchestration is typically performed up front in the design process although there may be processes that will require intervention or alternate action such as exception or fallout processing.

To support the large number of Orchestration requests, the orchestration engine will be exposed as a reusable service. With this approach, any component of the architecture can execute process recipes. Orchestration services will be capable of consuming a process recipe and executing against it to completion. The Service model maintains consistency and reusability across all orchestration activities and ensures consistent methods, structure and version of the workflow execution environment.

DCAE module 227 includes an analytic applications module, streaming framework, an events pub/sub, real-time collectors, APIs, and batch collector. In the integrated cloud environment virtualized functions across various layers of functionality are expected to be instantiated in a significantly dynamic manner that requires the ability to provide real-time responses to actionable events from virtualized resources, applications, as well as requests from customers, carrier partners and other providers. In order to engineer, plan, bill and assure these dynamic services, DCAE module 227 within the framework of the ECOMP platform 100 gathers key performance, usage, telemetry and events from the dynamic, multi-vendor virtualized infrastructure in order to compute various analytics and respond with appropriate actions based on any observed anomalies or significant events. These significant events include application events that lead to resource scaling, configuration changes, and other activities as well as faults and performance degradations requiring healing. The collected data and computed analytics are stored for persistence as well as use by other applications for business and operations (e.g., billing, ticketing). More importantly, the DCAE module 227 has to perform a lot of these functions in real-time.

DCAE module 227 provides real-time collectors necessary to collect the instrumentation made available in the integrated cloud infrastructure. The scope of the data collection includes all of the physical and virtual elements (compute, storage and network) in the integrated cloud infrastructure. The collection includes the types of events data necessary to monitor the health of the managed environment, the types of data to compute the key performance and capacity indicators necessary for elastic management of the resources, the types of granular data (e.g., flow, session & call records) needed for detecting network & service conditions, etc. The collection will support both real-time streaming as well as batch methods of data collection.

DCAE module 227 needs to support a variety of applications and use cases ranging from real-time applications that have stringent latency requirements to other analytic applications that have a need to process a range of unstructured and structured data. DCAE module 227 needs to support all of these needs and must do so in a way that allows for incorporating new storage technologies as they become available. This may be done by encapsulating data access via APIs and minimizing application knowledge of the specific technology implementations.

Given the scope of requirements around the volume, velocity and variety of data that DCAE module 227 needs to support, the storage may use technologies that Big Data has to offer, such as support for NOSQL technologies, including in-memory repositories, and support for raw, structured, unstructured and semi-structured data. While there may be detailed data retained at the edge layer of DCAE module 227 for detailed analysis and trouble-shooting, applications may optimize the use of bandwidth and storage resources by ensuring they propagate only the required data (reduced, transformed, aggregated, etc.) for other analyses.

The DCAE module 227 includes an analytic framework which is an environment that allows for development of real-time applications (e.g., analytics, anomaly detection, capacity monitoring, congestion monitoring, alarm correlation etc.) as well as other non-real-time applications (e.g., analytics, forwarding synthesized or aggregated or transformed data to Big Data stores and applications); the intent is to structure the environment that allows for agile introduction of applications from various providers (Labs, IT, vendors, etc.). The framework supports the ability to process both a real-time stream of data as well as data collected via traditional batch methods. The analytic framework supports methods that allow developers to compose applications that process data from multiple streams and sources. Analytic applications are developed by various organizations, however, they all run in the DCAE module 227 and are managed by a DCAE controller (not shown). These applications are microservices developed by a broad community and adhere to the standards of the ECOMP platform 100.

The following list provides examples of types of applications that can be built on top of DCAE module 227 and that depend on the timely collection of detailed data and events by DCAE module 227. Analytics applications will be the most common applications that are processing the collected data and deriving interesting metrics or analytics for use by other applications or operations. These analytics range from very simple ones (from a single source of data) that compute usage, utilization, latency, etc. to very complex ones that detect specific conditions based on data collected from various sources. The analytics could be capacity indicators used to adjust resources or could be performance indicators pointing to anomalous conditions requiring response. The Fault/Event Correlation application is a key application that processes events and thresholds published by managed resources or other applications that detect specific conditions. Based on defined rules, policies, known signatures and other knowledge about the network or service behavior, this application would determine root cause for various conditions and notify interested applications and operations.

A performance surveillance and visualization application provides a window to operations notifying them of network and service conditions. The notifications could include outages and impacted services or customers based on various dimensions of interest to Operations. They provide visual aids ranging from geographic dashboards to virtual information model browsers to detailed drilldown to specific service or customer impacts. The capacity planning application provides planners and engineers the ability to adjust forecasts based on observed demands as well as plan specific capacity augments at various levels, e.g., network functions virtualization infrastructure (NFVI) level (technical plant, racks, clusters, etc.), Network level (bandwidth, circuits, etc.), Service or Customer levels. A testing and trouble-shooting application provides operations the tools to test and trouble-shoot specific conditions. They could range from simple health checks for testing purposes, to complex service emulations orchestrated for troubleshooting purposes.

In both cases, DCAE module 227 provides the ability to collect the results of health checks and tests that are conducted. These checks and tests could be done on an ongoing basis, scheduled or conducted on demand. Some components of integrated cloud environment may expose new targets for security threats. Orchestration and control, decoupled hardware and software, and commodity hardware may be more susceptible to attack than proprietary hardware. However, software defined networks (SDN) and virtual networks also offer an opportunity for collecting a rich set of data for security analytics applications to detect anomalies that signal a security threat, such as distributed denial of service (DDoS) attack, and automatically trigger mitigating action. The applications that are listed above are by no means exhaustive and the open architecture of DCAE module 227 will lend itself to integration of application capabilities over time from various sources and providers.

Disclosed herein is a framework that caters to automation of several operational use cases in managing virtual network functions (vNF) that may be used in a cloud network. operational micro-services design, development, and deployment (OMD3) architecture separates the Ops functions (MOPs—Methods of Procedure) as a separate entity, isolates those functions as re-useable, and connects it to an open loop.

Figure 3:
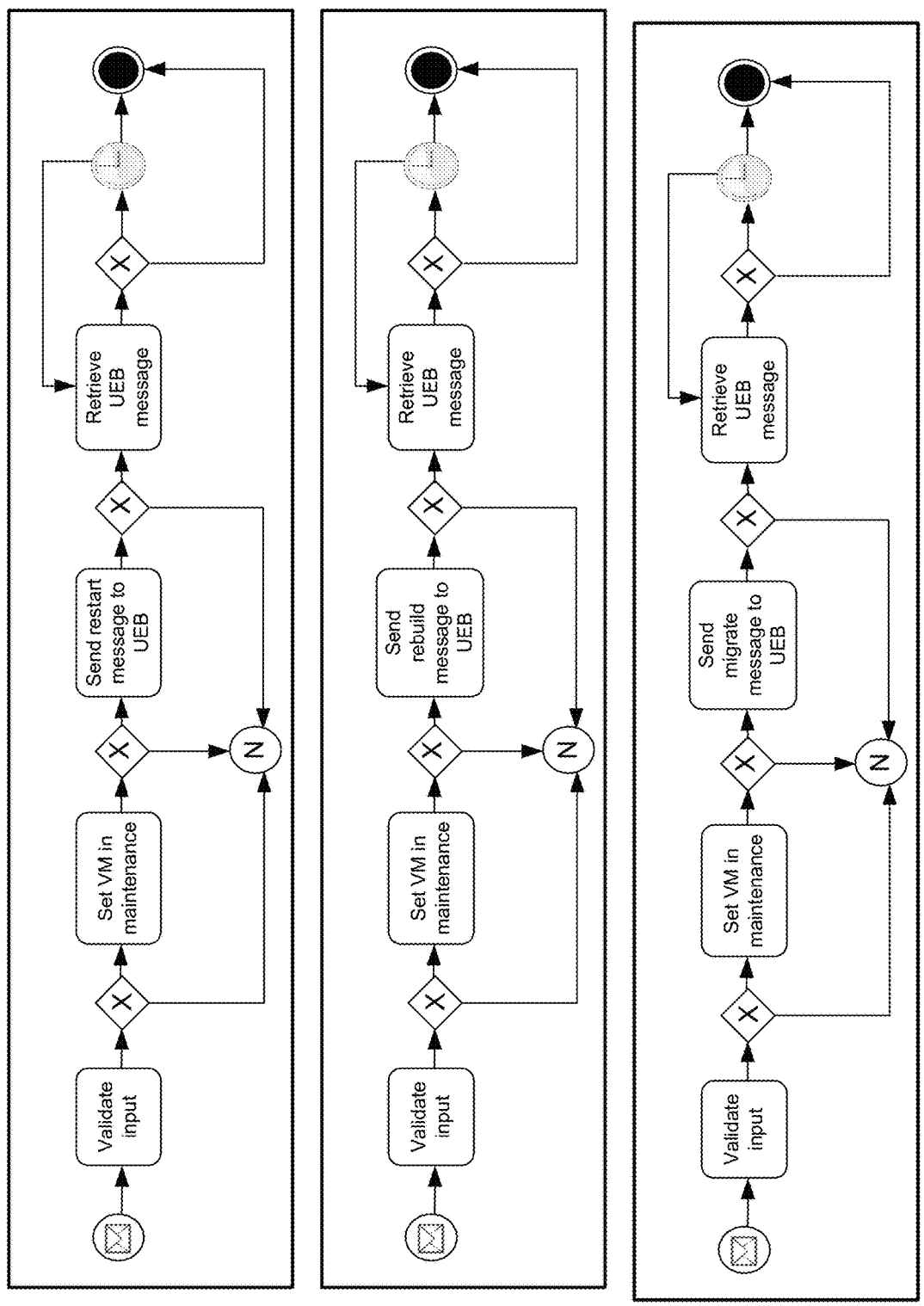
FIG. 3 illustrates exemplary workflows.

The typical open loop task execution involves operations engineers manually performing various tasks in order to lifecycle manage Layer 3 or Layer 4 VNFs, for example. Use cases may include restarting virtual machines (VMs), virtual functions (VNFs), perform health diagnostics, migrate virtual machines to different availability zones, or performing other SDN operation tasks. FIG. 3 illustrates exemplary workflows that may conventionally take 12 weeks or more to build. Conventionally business process modeling notation (BPMN) workflows are built for a specific use case and cannot be reused by other use cases even if a repeatable pattern exists. Therefore an additional 12 weeks of rebuild time, for example, may be used for the next build and use of VM restart 106. In addition, conventionally, once these workflows are built to execute the task at hand (e.g., VM restart 106, VM rebuild 107, or VM migrate 108) they would need to be manually started after each success. So for example, once VM 106 was completed an operations engineer would have to manually start VM rebuild 107 if the operations engineer wanted that to be the next task. As disclosed herein, conventional manual tasks which are performed by operations engineers may now be implemented as a reusable workflow design and execution which may perform the tasks through series of activities. Therefore this reusable workflow design and execution may lead to substantial development time savings over conventional implementations.

The reusable workflow design and execution (e.g., a generic workflow) executes each activity based on a metadata input. The individual activity within the workflow may call external systems through API layer, log state of each activity, gather metrics for each execution of the workflow or task instance, or provide a notification using communication systems such as Chat Bot, email, and external systems about the status of the execution (success/failure) through API. The created workflow may be exposed as an API to external systems, which may increase reusability and bring consistency in SDN operations that may help efficiency.

Figure 4:
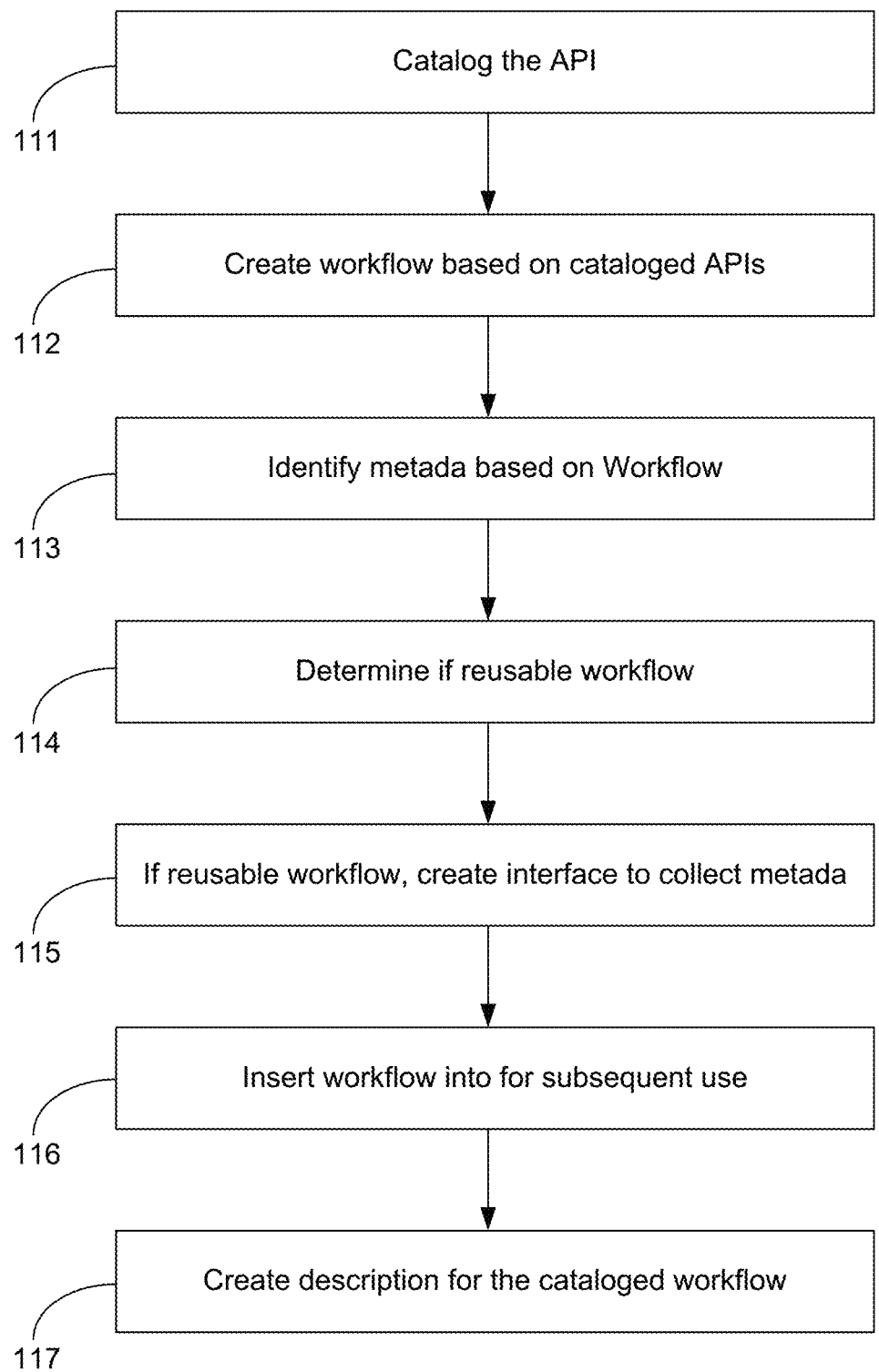
FIG. 4 illustrates an exemplary method for operational micro-services design development, and deployment.

FIG. 4 illustrates an exemplary method for operational micro-services design development, and deployment. At step 111, a catalog of application programming interfaces (APIs), which may also be known as a service catalog, may be created. For example, APIs may be from one or more modules, such as A&AI module 223 or DCAE module 227. At step 112, a workflow may be created based on one or more of the cataloged APIs for a VM, VNF, or the like. In an example, API may be a set maintenance flag API, a reset maintenance flag API, or a VM health diagnostic API. A workflow may combine multiple APIs (e.g., VM Migrate request to APP-C module) or another workflow (e.g., VM restart 106). At step 113, metadata may be identified based on the workflow. The metadata may be generated based on the task data. This may be system generated (e.g., Workflow designer).

With continued reference to FIG. 4, at step 114, the workflow may be determined to be reusable, which may be based on the types of underlying APIs used from step 112 (e.g., some APIs may have an indicator that they are not reusable). A workflow may be determined to be reusable based on a comparison to other workflows. For example, there may be a comparison of the underlying APIs of the current workflow (e.g., VM restart 106) to previous workflows (VM rebuild 107). The current workflow may be determined to be reusable based on the following factors: whether the underlying APIs are the same, are in the same order of execution, or are set to repeat the same number of times, among other things. Another factor may be with regard to the percentage of the same APIs in the current workflow in comparison to one or more previous workflows (e.g., average of the previous workflow) to determine whether the current workflow is reusable. For example, if the current workflow has less than 90% of the same APIs in use, then the current workflow of step 112 may be determined to be reusable. It contemplated herein that the factors above may be considered alone or together in several combinations (e.g., 2 factors with different weights) to determine whether the workflow is reusable.

Figure 5:
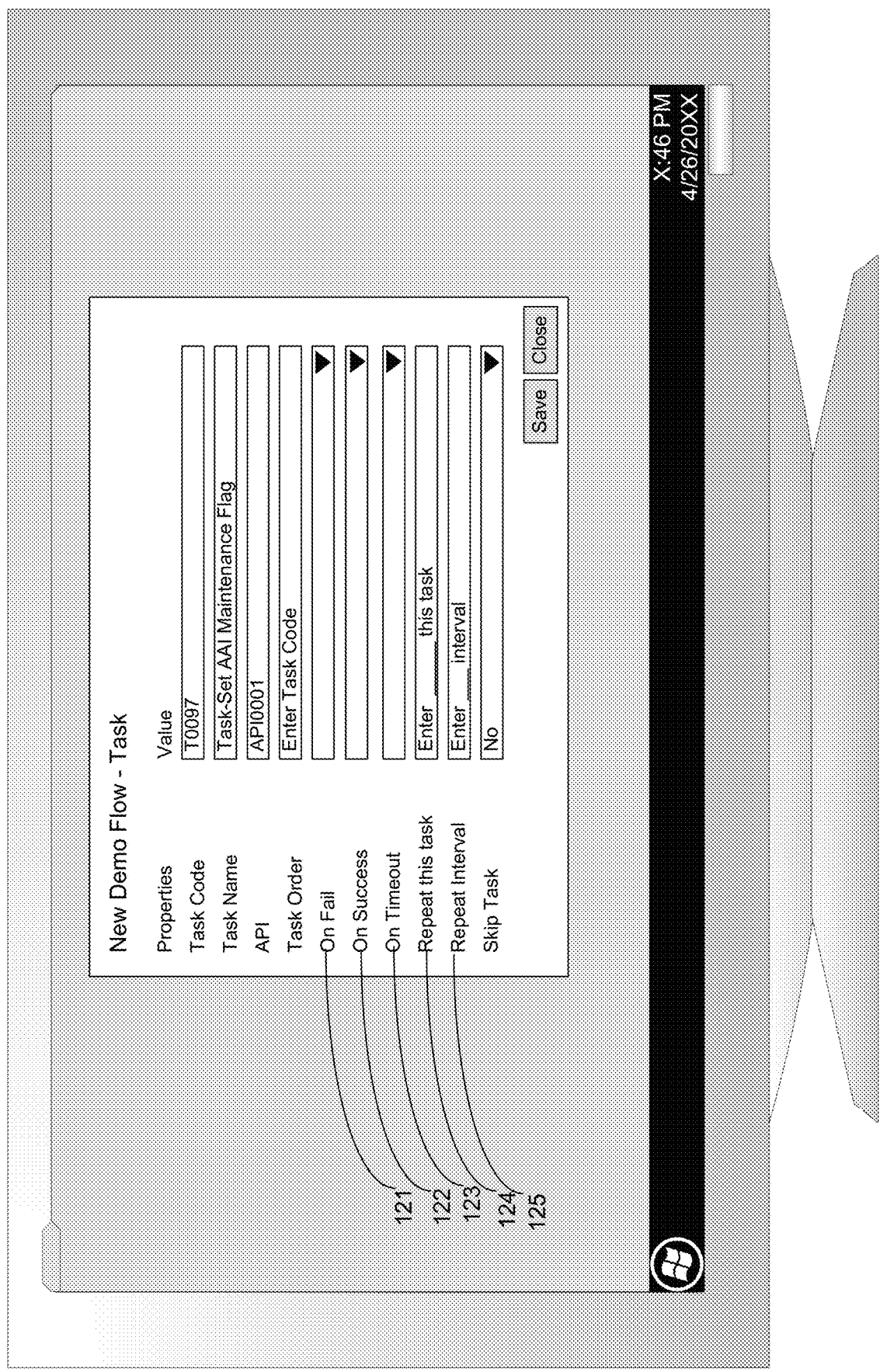
FIG. 5 illustrates APIs that may be executed within the workflow.

At step 115, if the workflow is determined to be reusable, an interface may be created to collect metadata. The interface may be a graphical user interface similar to what is shown in FIG. 5 that shows one of the APIs that may be executed within the workflow. As shown in FIG. 5, the metadata may be as simple as what happens if a status of the API or workflow fails (block 121), is successful (block 122), or there is a timeout (block 123). In addition, metadata may include the number of times the API should be repeated or the interval between repeats, among other things.

At step 116, the workflow may be added to a catalog of reusable workflows for subsequent use. During a subsequent use (e.g., reuse) of the workflow the created graphical user interface of step 115 may be displayed in order for the metadata to be inserted. There may be a default termination that the workflow is added to the catalog for a temporary predetermined period of time (e.g., 30 or 90 days). Within that period of time, the number of times the workflow is used, alone or in combination with other workflows, may contribute to determining whether it is considered a semi-permanent (e.g., not removed for several years or only removed under intentional deletion by a user) to the catalog or resets to another temporary time period (e.g., additional 6 month period) in the catalog. It is contemplated herein that a continuous addition of workflows to the catalog may cause decreased efficiency and increased time of development because there may be a very large number of workflows (which were really not generated in a way to be reused) to select from in the catalog.

At step 117, a description of the reusable workflow may be created in order to facilitate subsequent use of the workflow. The description may be automatically populated based on a comparison of workflows. For example, the description of the current workflow may be auto populated with the description of a previous workflow with the highest percentage of similarity to the current workflow, which may be based on one more different factors, such as the factors of step 114 or the like.

Figure 6:
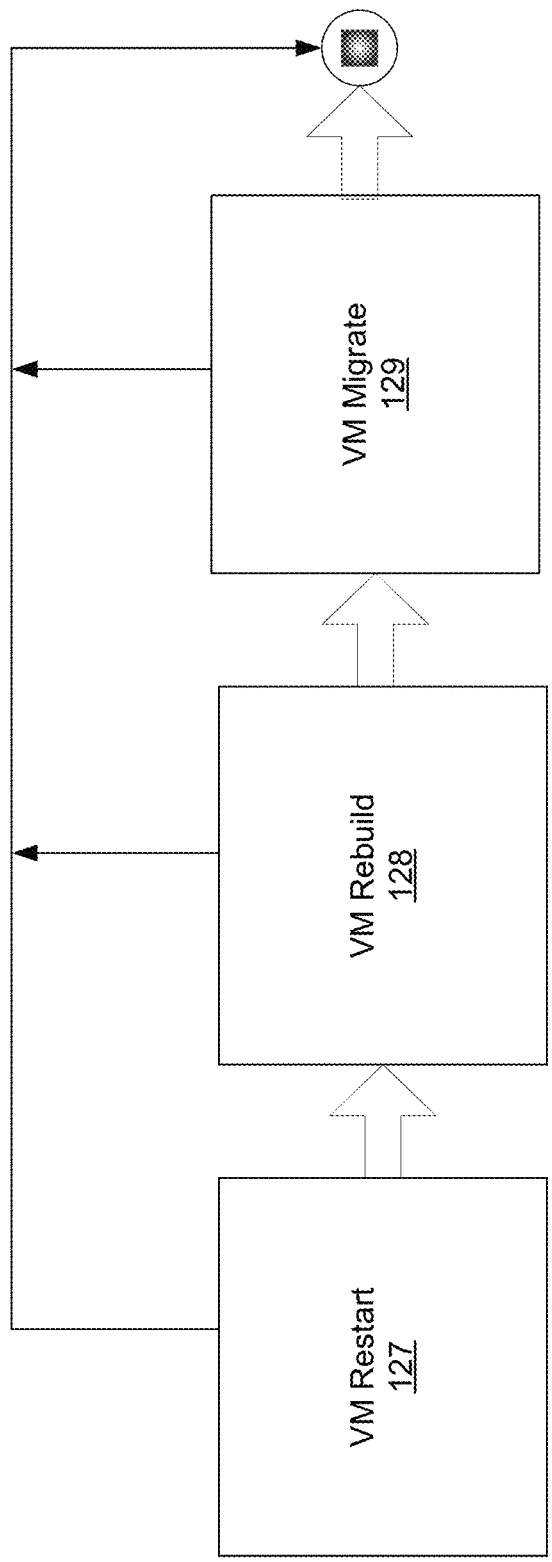
FIG. 6 illustrates an exemplary workflow that includes a plurality of workflows.

FIG. 6 illustrates an exemplary workflow that includes a plurality of workflows. As shown, these workflows may be sequenced and only continue if each has a success or failure. For example, a server may not execute VM rebuild 128 if VM restart 127 executed and outputted a failure status. The workflow of FIG. 6 may be manipulated via user interface of a display (e.g., display unit 512).

A system which comprises the above with regard to workflow may increase operational efficiency in a SDN and reduce the development costs in authoring BPMN workflows for the pattern of execution.

Figure 7:
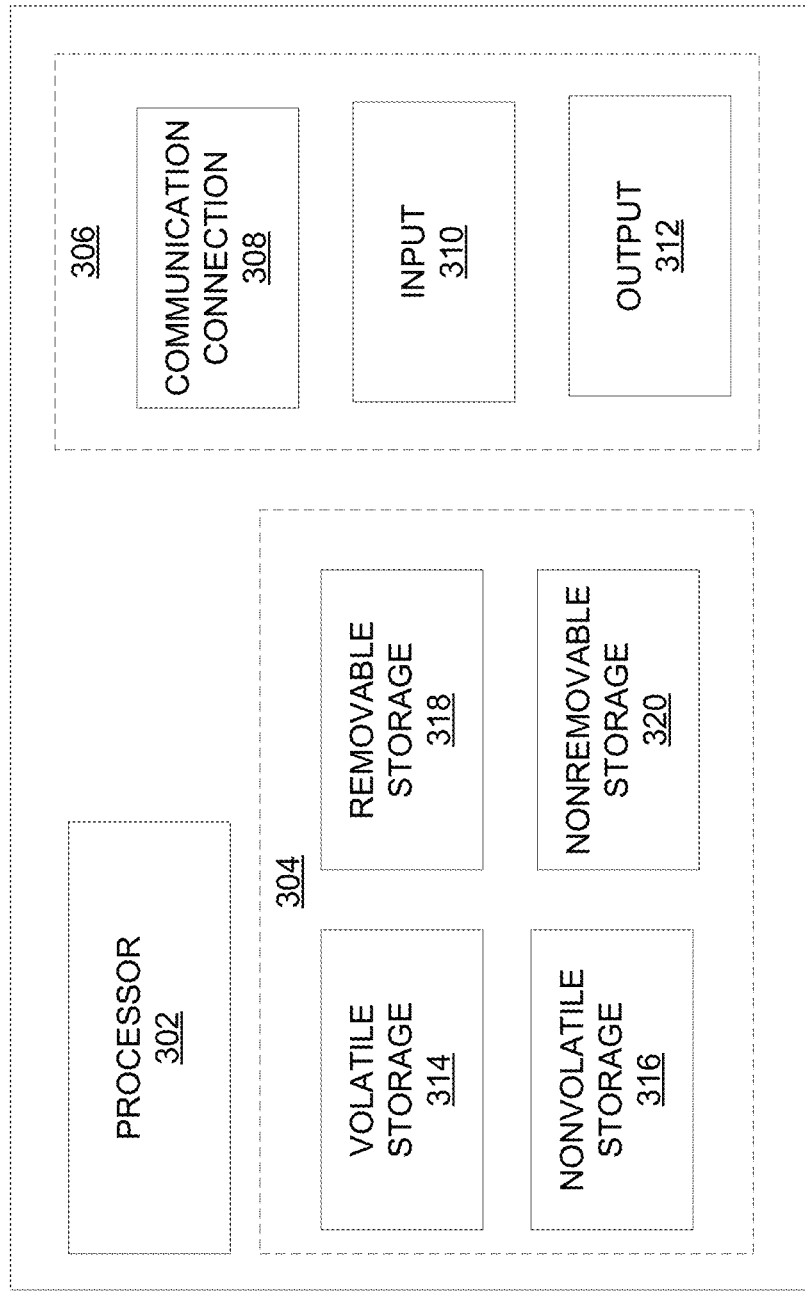
FIG. 7 illustrates a schematic of an exemplary network device.

FIG. 7 is a block diagram of network device 300 that may be connected to or comprise a component of a network. Network device 300 may comprise hardware or a combination of hardware and software. The functionality to facilitate telecommunications via a telecommunications network may reside in one or combination of network devices 300. Network device 300 depicted in FIG. 7 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 7 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 7) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 8:
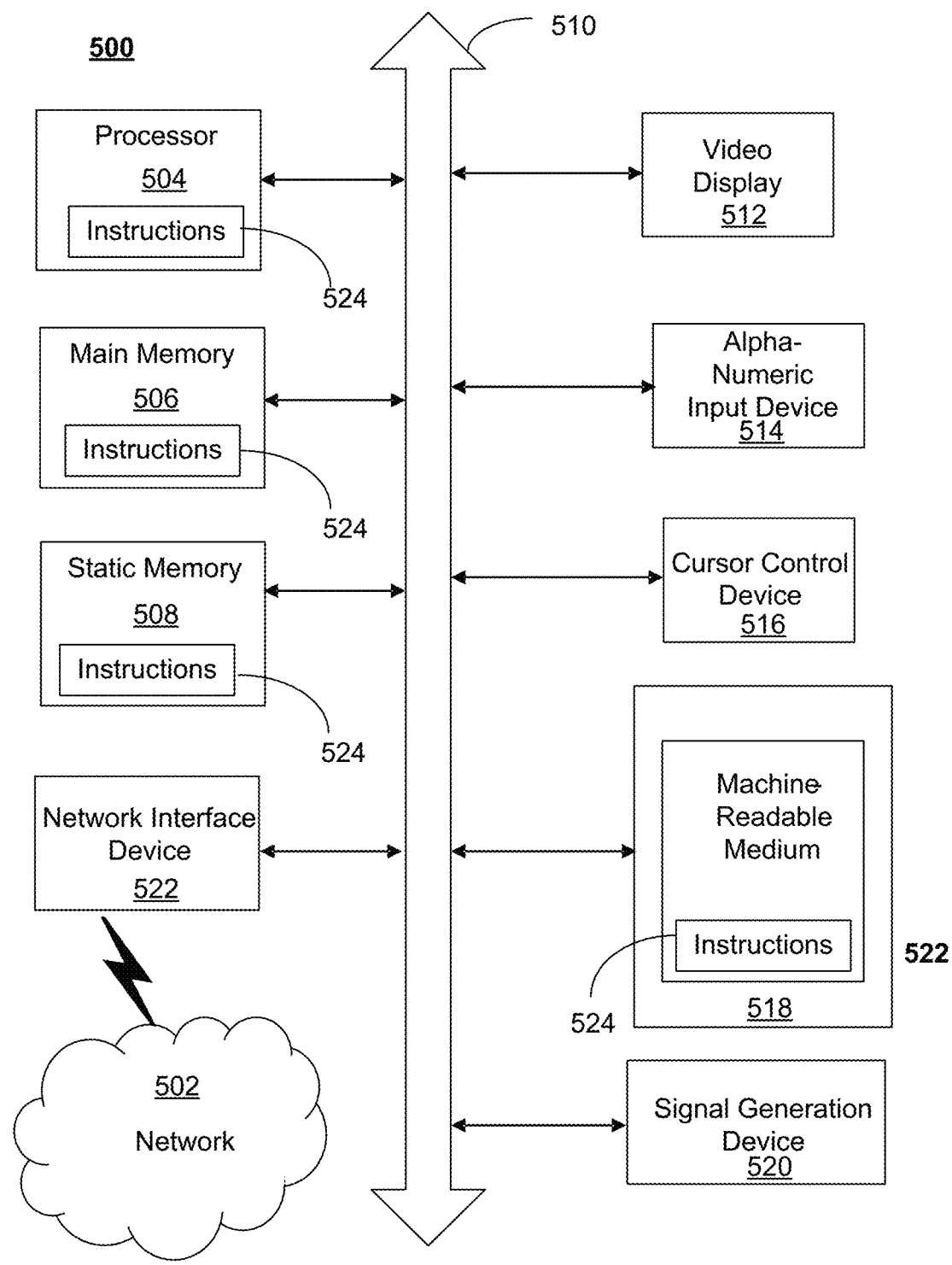
FIG. 8 illustrates an exemplary communication system that provides wireless telecommunication services over wireless communication networks.

FIG. 8 depicts an exemplary diagrammatic representation of a machine in the form of a computer system 500 within which a set of instructions, when executed, may cause the machine to perform any one or more of the methods described above. One or more instances of the machine can operate, for example, as processor 302, and other devices disclosed herein. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512. With specific reference to operational micro-services design, deployment, and development, there may be a user interface that provides a task management dashboard. The typical tasks may be start and stop, migrate, health check, rebuild and several other SDN related operation tasks for a particular virtual machine or virtual network function. In this disclosure, a user interface framework may orchestrate SDN operational functions using: a) Metadata Input Designer, b) API Stitching in a flexible BPMN workflow, or c) secure access using roles so that resources can be manipulated only by authorized users. The user interface may enable onboarding new VNFs, VMs quickly with minimal development.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 9A:
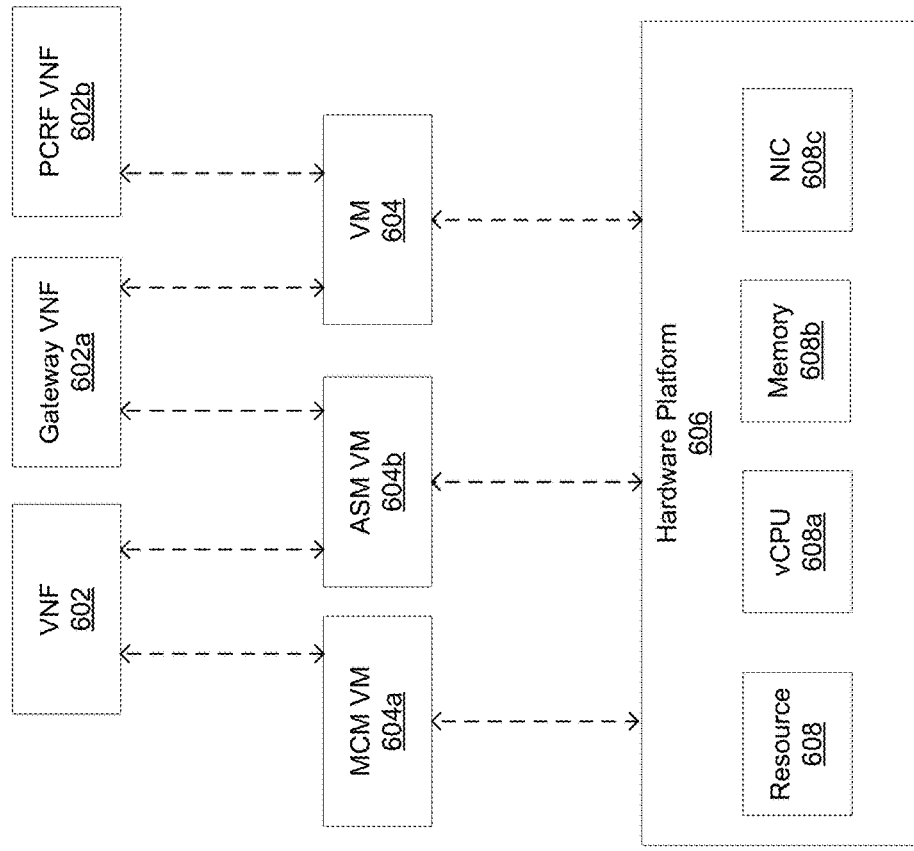
FIG. 9A is a representation of an exemplary network.

FIG. 9A is a representation of an exemplary network 600. Network 600 may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 9A illustrates a gateway VNF 602*a* and a policy and charging rules function (PCRF) VNF 602*b*. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 9A illustrates a management control module (MCM) VM 604*a*, an advanced services module (ASM) VM 604*b*, and a DEP VM 604*c*. Additionally or alternatively, VMs 604 may include other types of VMs. Each VM 604 may consume various network resources from a hardware platform 606, such as a resource 608, a virtual central processing unit (vCPU) 608*a*, memory 608*b*, or a network interface card (NIC) 608*c*. Additionally or alternatively, hardware platform 606 may include other types of resources 608.

Figure 9B:
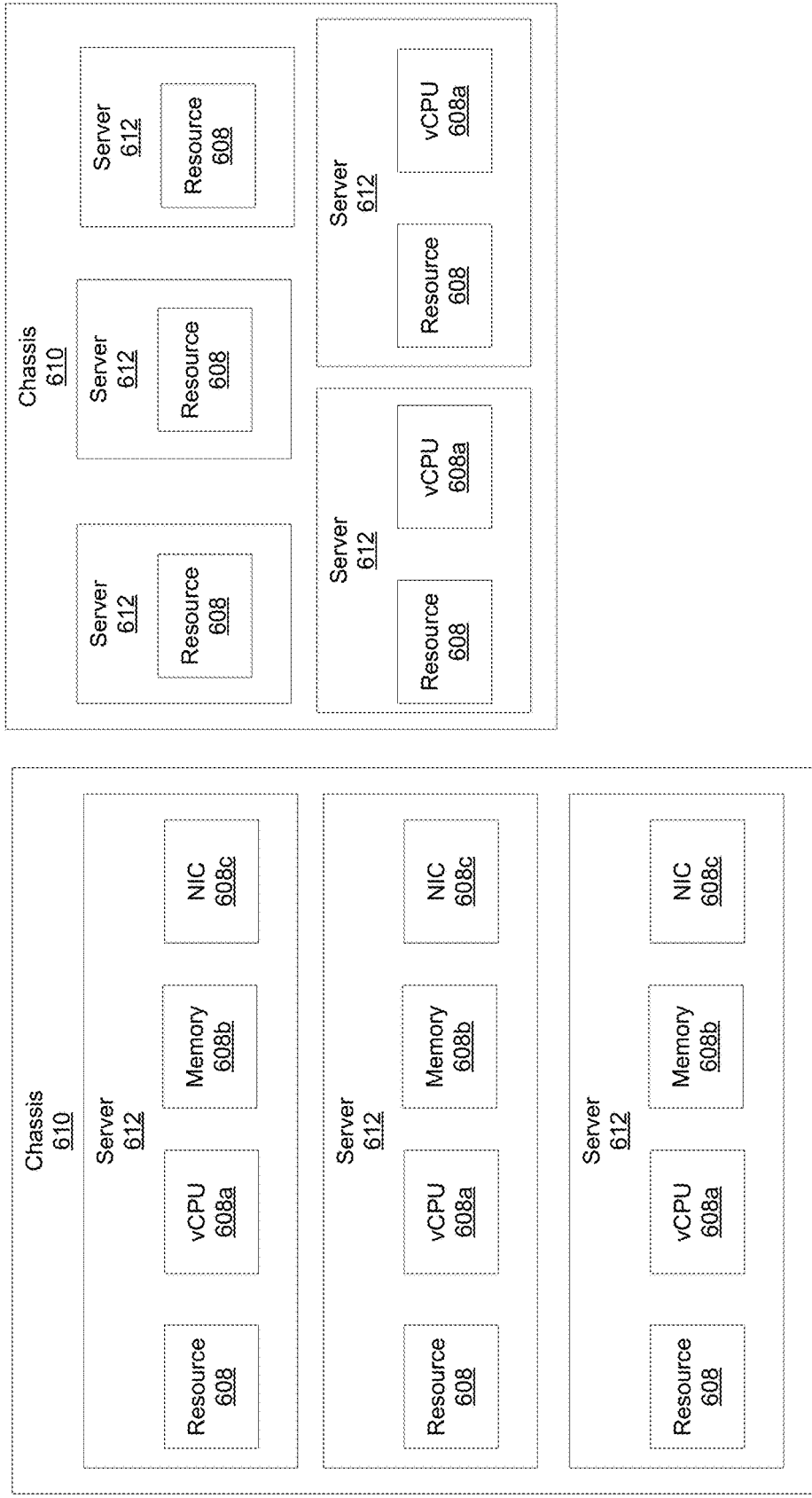
FIG. 9B is a representation of an exemplary hardware platform for a network.

While FIG. 9A illustrates resources 608 as collectively contained in hardware platform 606, the configuration of hardware platform 606 may isolate, for example, certain memory 608*c* from other memory 608*c*. FIG. 9B provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 9B illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608*a*, 1 GB of memory 608*b*, and 2 NICs 608*c*, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which operational micro-services design, development, and deployment processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—operational micro-services design, development, or deployment—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. An apparatus comprising:
a processor; and
a memory coupled with the processor, the memory comprising executable instructions stored thereon that when executed by the processor cause the processor to effectuate operations comprising:
generating a workflow for a virtual machine, wherein the workflow comprises a first application programming interface (API) and a second API;
determining that the workflow is reusable, wherein the determining the workflow is reusable is based on a type of a first API or the second API; and
responsive to determining that the workflow is reusable, cataloging the workflow for reuse.

2. The apparatus of claim 1, the operations further comprising based on the determining that workflow is reusable, creating an interface to obtain metadata for the first API or the second API of the workflow.

3. The apparatus of claim 1, the operations further comprising:
activating the workflow; and
based on activating the workflow, generating a graphical user interface to obtain metadata for the first API or the second API of the workflow.

4. The apparatus of claim 1, the operations further comprising based on the determining that workflow is reusable, creating an interface to obtain metadata for the first API or the second API of the workflow, wherein the metadata includes a number of times to repeat the first API or the second API.

5. The apparatus of claim 1, wherein the determining the workflow is reusable is further based on an order of execution of the first API and the second API.

6. The apparatus of claim 1, wherein the determining the workflow is reusable is based on a comparison of the workflow to another workflow.

7. The apparatus of claim 6, wherein the comparison indicates the workflow is reusable when a predetermined percentage of APIs in the workflow are also in another workflow.

8. A method comprising:
generating, by a server, a workflow for a virtual machine, wherein the workflow comprises a first application programming interface (API) and a second API;
determining, by the server, that the workflow is reusable, wherein the determining the workflow is reusable is based on a type of a first API and the second API;
responsive to determining that the workflow is reusable, cataloging, by the server, the workflow for reuse.

9. The method of claim 8, further comprising based on the determining that workflow is reusable, creating an interface to obtain metadata for the first API or the second API of the workflow.

10. The method of claim 8, further comprising:
activating the workflow; and
based on activating the workflow, generating a graphical user interface to obtain metadata for the first API or the second API of the workflow.

11. The method of claim 8, further comprising based on the determining that workflow is reusable, creating an interface to obtain metadata for the first API or the second API of the workflow, wherein the metadata includes a number of times to repeat the first API or the second API.

12. The method of claim 8, the operations further comprising identifying metadata based on the workflow.

13. The method of claim 8, wherein the determining the workflow is reusable is further based on an order of execution of the first API and the second API.

14. The method of claim 8, wherein the determining the workflow is reusable is based on a comparison of the workflow to another workflow.

15. A computer readable storage medium storing computer executable instructions that when executed by a computing device cause said computing device to effectuate operations comprising:
generating a workflow for a virtual machine, wherein the workflow comprises a first application programming interface (API) and a second API;
determining that the workflow is reusable, wherein the determining the workflow is reusable is based on a type of a first API or the second API; and
responsive to determining that the workflow is reusable, cataloging the workflow for reuse.

16. The computer readable storage medium of claim 15, the operations further comprising based on the determining that workflow is reusable, creating an interface to obtain metadata for the first API or the second API of the workflow.

17. The computer readable storage medium of claim 15, the operations further comprising:
activating the workflow; and
based on activating the workflow, generating a graphical user interface to obtain metadata for the first API or the second API of the workflow.

18. The computer readable storage medium of claim 15, the operations further comprising based on the determining that workflow is reusable, creating an interface to obtain metadata for the first API or the second API of the workflow, wherein the metadata includes a number of times to repeat the first API or the second API.

19. The computer readable storage medium of claim 15, wherein the determining the workflow is reusable is further based on an order of execution of the first API and the second API.

20. The computer readable storage medium of claim 15, wherein the determining the workflow is reusable is based on a comparison of the workflow to another workflow.

* * * * *